United States Patent [19]

Talonen et al.

[11] Patent Number: 5,611,989
[45] Date of Patent: Mar. 18, 1997

[54] METHOD FOR PRODUCING EASILY VOLATILE MATERIALS

[75] Inventors: Timo Talonen, Pori; Heikki Eerola; Antti Roine, both of Ulvila, all of Finland

[73] Assignee: Outokumpu Research Oy, Pori, Finland

[21] Appl. No.: 574,354

[22] Filed: Dec. 18, 1995

Related U.S. Application Data

[63] Continuation-in-part of Ser. No. 320,855, Oct. 11, 1994, abandoned.

[30] Foreign Application Priority Data

Oct. 14, 1993 [IT] Italy .......................................... 934550

[51] Int. Cl.⁶ ...................................................... C21B 7/00
[52] U.S. Cl. .............................. 266/44; 266/171; 75/668; 75/688
[58] Field of Search ....................................... 266/171, 242, 266/44; 25/688, 654, 656, 663, 668, 695, 696

[56] References Cited

U.S. PATENT DOCUMENTS

| | | | |
|---|---|---|---|
| 4,213,599 | 7/1980 | Dewing et al. | 266/171 |
| 4,243,411 | 1/1981 | Anderson | 75/668 |
| 4,245,822 | 1/1981 | Dewing et al. | 266/171 |
| 4,741,770 | 5/1988 | Andrews et al. | 75/688 |

*Primary Examiner*—Scott Kastler

[57] ABSTRACT

The invention relates to a method to be used in producing easily volatile metals from their sulfides. The method employs two closely connected furnaces, a reduction furnace and a converter, which are operated at normal pressure, so that the material transfer therebetween is arranged to be carried out continuously at normal pressure through the channels provided in between the furnaces. As a result of chemical reactions taking place in the furnaces, the hydrostatic pressure in the furnaces changes, and the circulations caused by these changes through the channels at the same time bring about recycling of the sulfide matte needed in the process from the reduction furnace to the converter and the recycling of the molten metal from the converter to the reduction furnace.

6 Claims, 2 Drawing Sheets

METHOD FOR PRODUCING EASILY VOLATILE MATERIALS

CROSS REFERENCE TO RELATED APPLICATIONS

This application is a continuation-in-part of prior U.S. patent application Ser. No. 320,855 filed Oct. 11, 1994, now abandoned.

BACKGROUND OF THE INVENTION

The present invention relates to a method and furnace construction to be used in processes for producing easily volatile metals from their sulfides. The furnace construction comprises two closely connected furnaces, a reduction furnace and a converter, which are operated at normal pressure, so that the material transfer therebetween is arranged to take place continuously by means of at least one channel provided in between the furnaces. As a result of chemical reactions taking place in the furnaces, the hydrostatic pressure of the furnaces changes. In addition, volumes of the melt layers in the furnaces change. Circulations via at least one channel resulting from these changes at the same time bring about recycling of sulfide matte from the reduction furnace to the converter, which is needed in the process, as well as the recycling of molten metal from the converter to the reduction furnace. Simultaneous flows in opposite directions are produced.

DESCRIPTION OF RELATED ART

Some newer pyrometallurgical processes for producing zinc, lead, cadmium and some other easily volatile metals utilize the reduction of the said metal sulfides by means of copper, in which case there are formed copper matte and vapors of the metals in question, which are then condensed. In these processes, copper matte is continuously removed from the reaction space and transferred to another furnace in order to oxidize the sulfur contained in the matte and in order to release the copper back to metallic copper. Metallic copper is continuously removed from the copper matte processing furnace and returned to the said reaction space to replace the copper consumed in the reduction of metal sulfide. The oxidic substances contained in the raw material, or the substances that possibly oxidize in the process, form a slag layer in the furnace which serves as the reaction space, which slag layer also must be removed either from time to time or continuously.

In order to perform the above described functions, the GB patent application 2 048 309 utilizes a combination of furnaces comprising two adjacent reverber-type furnaces, one of which is located somewhat higher than the other. Concentrate is fed into a molten copper matte located in the lower furnace. The zinc sulfide of the concentrate is converted into metallic zinc, which is volatilized from the furnace. The copper matte formed in the furnace is recycled by means of a gas lift through an underpressure chamber to the upper furnace, where it or at least part thereof is oxidized with the oxygen supplied into the furnace into metallic copper, which due to gravity circulates back into the smelting furnace located underneath. The heat required by endothermic reactions taking place in the smelting furnace and the underpressure pump is obtained by circulating an excessive amount of sulfide matte in the upper furnace serving as a converter, or the matte can be further heated by means of burners.

The Finnish patent application 92 2301 relates to a zinc process resembling the one described above, wherein the used reaction space is an electric furnace. In the furnace there are essentially two molten layers: metallic copper on the bottom, and sulfidic copper matte on top of that. As a third layer in the furnace, there is formed a slag layer on top of the matte layer. A sulfidic raw material is fed into the copper layer pneumatically through a tubular lance. The used carrier gas is nitrogen or some other inert gas. As a result of the reactions taking place in the copper layer there is formed matte which arises from the copper layer and enters the matte layer located thereupon.

The electric furnace is heated by electric current, by getting the electrodes into contact with the layers of matte and slag. Now these layers serve as a resistor where thermal energy develops. The formed copper matte can be converted into copper and slag according to some known process, for instance in a Pierce-Smith converter.

The Pierce-Smith converter is a batch reactor, and consequently the whole process is operated in a batchwise fashion, so that matte is removed from the electric furnace in batches, and copper is transferred from the converter to the electric furnace in batches. In addition to the drawbacks that are typical of batch processes, large amounts of matte and metallic copper must be transported in between the furnaces, which leads to additional costs and harmful fumes.

Continuously operated converters also are used nowadays. In the Mitsubishi copper process, copper matte flows from the smelting furnace in a continuous flow along the chute to the converting furnace. Typically there are three layers: molten copper at the bottom and copper matte on top of it, the topmost layer being the slag layer. Converting takes place as a continuous process by blowing air or oxygen enriched air through cooled nozzles to the surface of the molten layer. The formed slag is removed continuously from the surface of the molten layer. The formed copper is removed as a continuous flow from the bottom of the converting furnace.

When the reduction furnace described in the Finnish patent application 92 2301, wherein the sulfide of volatile metal is reduced by copper, and a converter are interconnected by means of a chute, the formed matte can be conducted into the converter as a continuous flow. However, the formed copper must be removed from the converter at a level so low that the copper's own weight is not enough to make it flow back into the reduction reactor, but it must be tapped to a vessel and transported therein.

SUMMARY OF THE INVENTION

In order to avoid the above described drawbacks, i.e., the circulation of the melt caused by means of feeding gas into the process, or the transportation taking place from one furnace to another, there is now developed a method and furnace construction of the present invention, wherein the reduction furnace and the converting furnace are closely connected at normal pressure. Advantageously the furnaces are located on the same level, or on different levels, but they are interconnected by means of at least one channel. The chemical reactions taking place in each furnace cause the hydrostatic pressure in the furnaces to change. In addition, volumes of the melt layers in the furnaces change. Recycling of the different molten phases in between the furnaces also is carried out by means of the circulations caused by the said changes. Thus, the sulfide matte layer formed in the reduction furnace is recycled to the converter, and from the converter there is respectively recycled the already reduced molten metal back into the reduction furnace. Matte and slag flow simultaneously in opposite directions through the same channels.

BRIEF DESCRIPTION OF THE DRAWINGS

The invention is further described with reference to the appended drawings, wherein.

BRIEF DESCRIPTION OF THE DRAWINGS

Figure 1:
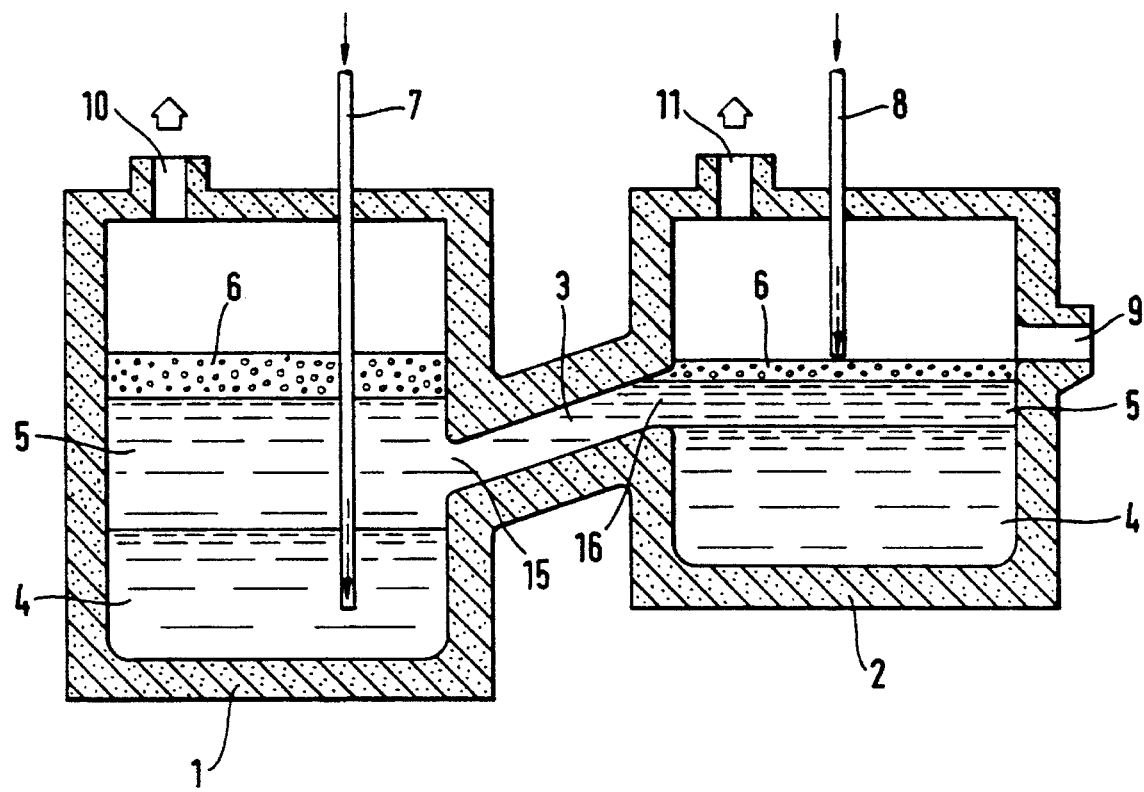
FIG. 1 is a schematical side view illustration of an embodiment of the apparatus of the present invention.

As is seen in FIG. 1, the furnace construction of the invention, to be used in processing easily volatile metals, comprises two furnaces wherein an electric furnace 1 is used as a reduction furnace, and a converter 2 serves as a matte oxidizing furnace. The furnaces may be arranged on the same level or on different levels.

In this embodiment of the invention, the furnaces are interconnected by means of a tubular channel 3. The form and the construction of the channel are not decisive but the channel can be either essentially horizontal or it can be inclined so that its reduction furnace side end 15 is either on a higher or lower level than the converter side end 16. Essential is that the channel is situated so that there is no connection between the gas spaces of the furnaces and that the copper metal formed in the converter owing to gravity, is recycled into the electric furnace. This means that at least another end of the channel must always be immersed in the melt, no matter the melt were metal, matter or slag. In practice, both of the ends of the channel are usually immersed in the melt.

The lowermost layer in both of the furnaces is a copper melt layer 4. There is a matte melt layer 5 on top of the copper melt layer, the topmost layer in both furnaces being a slag melt layer 6.

A sulfidic raw material, which contains at least one of the metals zinc, lead or cadmium, preferably zinc and possibly lead and cadmium, in sulfidic form, is injected into the reduction furnace by means of a lance 7. As a result of chemical reactions the amount of copper begins to decrease because it forms copper matte owing to the sulfidization of copper.

When the metal is converted to matte, the average density of the molten material is decreased and the melt level of the reduction furnace tends to rise. The rise of the hydrostatic pressure causes again transferring of matte into the converter.

The matte 5 and the elemental copper 4 flow simultaneously in opposite directions through the same channel 3, matte 5 (and possibly slag 6) flowing from the reduction furnace 1 to the converter 2 while molten copper 4 flows from the converter 2 to the reduction furnace 1.

In the converter the copper matter is oxidized with oxygen, air or their mixture blown through a lance 8, back to metallic copper. The formed copper settles as the heaviest on the bottom of the converter. During the process working, the surface of the copper layer is at such a height that the formed new copper settles due to gravity into the reduction furnace. The slag formed in the converting reaction is removed from the converter through a discharge opening 9.

The metal vapors formed in the reduction furnace like zinc vapor and possibly lead and cadmium vapor, are discharged from the top part of the reduction furnace through an aperture 10. Sulfur dioxide and other gases formed in the converter are discharged through an aperture 11 in the top part of the converter.

The channel 3 can be either essentially horizontal or inclined so that its converter side end 16 is either higher or lower than its reduction furnace side end 15. In addition to the above mentioned channel, the converter also includes a third opening 9 for removing slag 6 from the surface of the molten matte layer of the converter. A tap hole for removing the sulfide matte 5 coming from the reduction furnace is not provided, because the matte is oxidized therein, by means of oxygen or air blown through a lance 8, back into metallic copper. The slag discharge opening 9 is located at a height where it can be used to adjust at least one end of the channel 3 in between the converter and the reduction furnace to be always fully immersed in the slag and/or matte, in order to prevent the gases from the reduction furnace and the converter from getting mixed.

The zinc and possibly lead and cadmium vapors formed in the reduction furnace are removed from the top part of the furnace through the aperture 10. The sulfur oxide and other gases formed in the converter are removed from the converter through the aperture 11.

When all molten layers in both furnaces are in balance after starting the furnaces, the surface height in the converter settles on the level defined by the slag discharge opening 9, and the surface in the reduction furnace respectively settles on the level defined by the converter surface or the upper channel in between the reduction furnace and the converter. The thicknesses of the separate layers are settled so that in the converter the hydrostatic pressure caused by the copper, matte and slag layers is equal to the pressure caused by the copper, matte and slag layers located at the corresponding height in the reduction furnace.

When the process is started by injecting sulfidic raw material into the reduction furnace through the lance 7, and by simultaneously blowing air, oxygen or oxygen enriched air into the converter, the amount of copper contained in the reduction furnace starts to reduce, because it forms matte owing to the sulfidization of copper. In the converter, the copper matte recycled therein changes into metallic copper as a result of the converting reaction. In the course of the process, the average density of the molten material contained in the reduction reactor is thus reduced, and the average density of the material contained in the converter is respectively increased. As a result, the pressure balance in the channel between the furnaces is disturbed, and copper begins to flow from the converter into the reduction reactor. Respectively, matte formed in the reduction furnace and possibly slag begin to flow into the converter via the channel. These circulations continue as long as the process is being run.

In an alternative embodiment of the invention, the electric furnace and the converter are in fact parts of one and the same furnace, which parts are only separated by means of a partition wall, so that in between the two parts there remains one or many holes.

Figure 2:
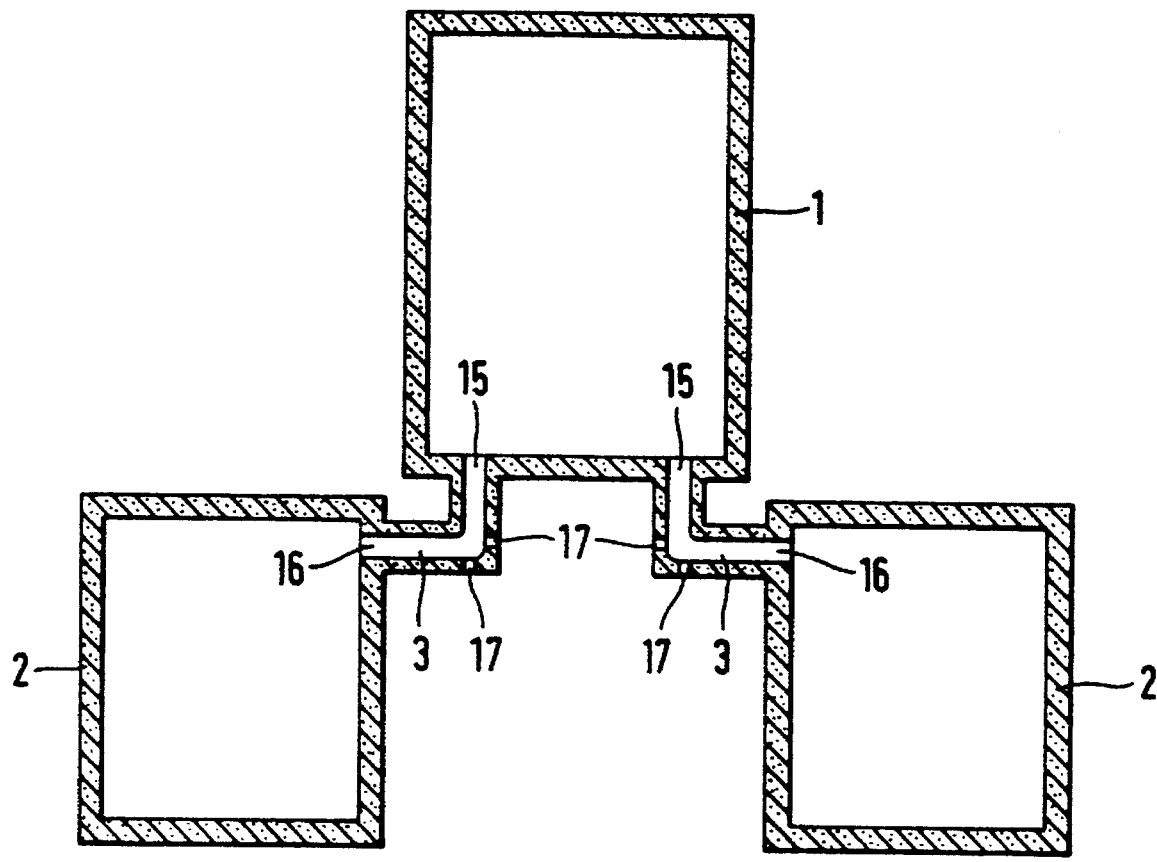
FIG. 2 is a top view illustration of an alternative embodiment of the apparatus of the present invention.

If it is to be suspected that the channel in between the reduction furnace and the converter may be blocked in some using conditions, the furnaces can advantageously be arranged cornerwise, in the fashion illustrated in FIG. 2. In that case the channels 3 connecting the furnaces 1 and 2 are advantageously formed of two elements arranged at right angles with respect to each other. In both parts, on different sides of the angle, there can be provided normal lockable openings 17 generally used in metallurgical furnaces, through which openings any possible blockages are removed for instance by melting with oxygen.

As is seen in FIG. 2, the number of the converters is not limited to one, but there may be several of them, for instance two per each reduction furnace, in which case one of them functions in normal fashion while the other is in maintenance.

The following specific examples illustrate the practice of the process of the invention.

EXAMPLE 1

Zinc concentrate containing 49.4% Zn, 31.1% S, 0.55% Pb and 0.21% Cd, was treated in the furnace construction according to FIG. 1 in a pilot plant experiment. In the beginning, 9,600 kg copper and 3,900 kg copper matte were charged into the electric furnace and part of the copper matte flowed directly into the converter. The converter was charged with an amount of 6,300 kg copper.

The zinc concentrate was injected into the electric furnace at a feeding rate of 300 kg/h, 26,000 kg altogether. At the same time, copper matte was converted by blowing a mixture of oxygen and air through a lance. Sand was added into the converter 40 kg/h in order to keep the converter slag as fluent. The converter slag was removed from the converter as an overflow. The zinc evaporated during the experiment was recovered with a zinc splash condenser.

The zinc concentrate reacts with copper according to following reaction equations:

$ZnS + 2Cu \rightarrow Z + Cu_2S$ $PbS + 2Cu \rightarrow Pb + Cu_2S$ $CdS + 2Cu \rightarrow Cd + Cu_2S$ $FeS_2 + 2Cu \rightarrow FeS + Cu_2S$ When 1,000 kg of the concentrate used in the experiment reacts with elemental copper, about 960 kg copper is consumed and the amount of copper matte formed is about 1,400 kg. At the end of the experiment there was 6,300 kg copper, 4,500 kg copper matte and 700 kg slag in the electric furnace. In the converter there was 6,300 kg copper, 1,500 kg copper matte and 500 kg slag.

The amount of the matte which flowed from the electric furnace into the converter through the channel during the experiment can be calculated as follows:

The amount of the transferred matte=(the amount of the matte at the beginning of the experiment in the electric furnace) +(the amount of the matte formed in the reactions)–(the amount of the matte at the end of the experiment in the electric furnace)=3,900 kg+26×1,400 kg–4,500 kg=35,800 kg.

The amount of copper which was flowed from the converter into the electric furnace through the channel can be calculated as follows:

The amount of the transferred copper=(the amount of copper at the end of the experiment in the electric furnace)+ (the amount of copper consumed in the reactions)–(the amount of copper at the beginning of the experiment in the electric furnace)=7,000 kg+26×960 kg–9,600 kg=22,360 kg.

EXAMPLE 2

Zinc concentrate containing 33.5% Zn, 27.1% S, 21.0% Pb and 0.06% Cd, was treated in the furnace construction according to FIG. 1 in a pilot plant experiment. At the beginning of the experiment there was 7,000 kg copper and 4,500 kg copper matte in the electric furnace. In the converter there was 6,300 kg copper and 1,500 kg copper matte.

The concentrate was injected at a feeding rate of 300 kg/h into the electric furnace, 16,000 kg altogether. Copper matte was converted to elemental copper in the converter simultaneously by blowing a mixture of oxygen and air through the lance into the converter. In order to maintain the converter slag as fluent, sand was added into the converter 35 Kg/h. The converter slag removed from the converter as an overflow. The zinc evaporated during the experiment was recovered with the zinc splash condenser.

When 1,000 kg of the concentrate used in this experiment reacts with elemental copper, copper is consumed about 880 kg and the amount of copper matte formed is about 1,280 kg.

At the end of the experiment there was 6,000 kg copper, 5,000 kg copper matte and 400 kg slag in the electric furnace and in the converter there was 6,300 kg copper, 1,500 kg copper matte and 500 kg slag.

The amount of the matte which flowed from the electric furnace into the converter through the channel during the experiment can be calculated as follows:

The amount of the transferred matte=(the amount of the matte at the beginning of the experiment in the electric furnace) +(the amount of the matte formed in the reactions)–(the amount of the matte at the end of the experiment in the electric furnace)=4,500 kg+16×1,280 kg–5,000 kg=11,856 kg.

The amount of copper which was flowed from the converter into the electric furnace through the channel during the experiment can be calculated as follows:

The amount of the transferred copper=(the amount of copper at the end of the experiment in the electric furnace)+ (the amount of copper consumed in the reactions)–(the amount of copper at the beginning of the experiment in the electric furnace)=6,000 kg+16×880 kg–7,000 kg=13,080 kg.

We can see from the examples that both matte and elemental copper flow in opposite directions to each other through the same channel.

What is claimed:

1. A method for producing easily volatile metals from sulfidic metal concentrates by means of two closely interconnected furnaces, comprising: feeding a sulfidic concentrate of at least one easily volatile metal into a molten metal bath in a reduction furnace for converting the easily volatile metal in the concentrate into metallic form and removing the easily volatile metal as metal vapor from the reduction furnace; forming a molten metal sulfide matte and slag in the reduction furnace and feeding the metal sulfide matte and slag in the reduction furnace and feeding the metal sulfide matte and slag to a molten metal bath in a converter through an inclined channel for conversion of the metal sulfide back to metal; discharging slag from the converter and feeding metal formed in the converter back to the reduction furnace through said channel, whereby simultaneous flow in opposite directions through the same channel of molten metal sulfide matte and slag from the reduction furnace to the converter and flow through the channel of metal from the converter to the reduction furnace is caused by changes in hydrostatic pressure and volumes of the molten metal baths resulting from chemical reactions occurring in the reduction furnace and converter.

2. The method of claim 1 wherein one end of the channel is immersed in the molten metal bath in the reduction furnace and an opposite end of the channel is immersed in the molten metal bath in the converter.

3. The method of claim 1 wherein the molten metal is molten copper.

4. The method of claim 1 wherein the reduction furnace and the converter are located essentially on the same level.

5. The method of claim 1 and including injecting oxygen-containing gas into the converter.

6. The method of claim 1 and including discharging slag from the converter.

* * * * *

UNITED STATES PATENT AND TRADEMARK OFFICE
CERTIFICATE OF CORRECTION

PATENT NO.    : 5,611,989
DATED         : March 18, 1997
INVENTOR(S)   : TIMO TALONEN et al It is certified that error appears in the above-identified patent and that said Letters Patent is hereby corrected as shown below:

Title page, under "[30] Foreign Application Priority Data", delete "Italy" and insert --Finland-- therefor.

Signed and Sealed this

Tenth Day of June, 1997

Attest:

Attesting Officer

BRUCE LEHMAN

Commissioner of Patents and Trademarks